United States Patent Office 3,423,354
Patented Jan. 21, 1969

3,423,354
ADHESIVE COMPOSITIONS
Thomas E. O. Jones, Sutton Coldfield, England, assignor to The Dunlop Company Limited, London County, England, a British company
No Drawing. Filed July 7, 1966, Ser. No. 563,378
Claims priority, application Great Britain, July 27, 1965, 31,916/65
U.S. Cl. 260—30.6        20 Claims
Int. Cl. C08f 29/18, 45/28

---

ABSTRACT OF THE DISCLOSURE

Heat curable adhesive compositions are prepared by plasticizing a polymer of vinyl chloride with a suitable plasticizer therefor, mixing the plasticized vinyl chloride polymer with an organic polyisocyanate and an aliphatic acid anhydride. Preferably, the anhydride is admixed with the plasticized vinyl chloride polymer and this mixture then blended with the polyisocyanate. Suitable proportions by weight of plasticized vinyl chloride polymer:aliphatic acid anhydride:organic polyisocyanate are 100:1–5:1–30. These novel compositions have a good pot-life and exhibit no substantial skin formation or change in adhesive properties upon storage for up to three days.

---

This invention relates to adhesive compositions and particularly to adhesive compositions comprising plasticized polymers of vinyl chloride and organic polyisocyanates.

According to the present invention an adhesive composition comprises a plasticized polymer of vinyl chloride, an organic polyisocyanate and an aliphatic acid anhydride.

According to the present invention also, a method for the manufacture of an adhesive composition comprises mixing together a plasticized polymer of vinyl chloride, an organic polyisocyanate and an aliphatic acid anhydride.

The aliphatic acid anhydride can be present in an amount of from 1 part to 5 parts and preferably from 2 parts to 3 parts by weight per 100 parts by weight of the polymer of vinyl chloride. The aliphatic acid anhydride may be the anhydride of a monobasic acid or a dibasic acid, and preferably the acid contains from 6 to 20 carbon atoms in the molecular chain. Particularly suitable anhydrides are those of acids which contain from 9 to 17 carbon atoms in the molecular chain, for example capric anhydride, lauric anhydride and stearic anhydride. The aliphatic acid anhydride is preferably mixed with the plasticized polymer of vinyl chloride prior to mixing the plasticized polymer with the organic polyisocyanate.

The plasticized polymer of vinyl chloride comprises a homopolymer of vinyl chloride or a copolymer of vinyl chloride with another vinyl monomer such as vinyl acetate or vinylidene chloride, and a plasticizer. The plasticizer may be any one of the conventional plasticizers for polyvinylchloride, for example, dibutyl phthalate, dinonyl phthalate and trixylyl phosphate. Epoxy plasticizers may also be used. The amount of plasticizer is not critical and may vary over a wide range, for example 10 parts to 150 parts and preferably from 50 parts to 120 parts by weight of the plasticizer per 100 parts of the polymer of vinyl chloride.

The polymer of vinyl chloride should preferably have a K value (the value is a measure of molecular weight and is obtained directly from the relative viscosity measurement at 25° C.) of from 50 to 80, and preferably from 55 to 75.

The organic polyisocyanate which is mixed with the plasticized polymer of vinyl chloride can be an aromatic polyisocyanate or an aliphatic or cycloaliphatic polyisocyanate. Usually, a diisocyanate will be used and examples of suitable compounds are hexamethylene diisocyanate, dicyclohexylmethane diisocyanate, diphenylmethane diisocyanate and toluylene diisocyanate. The amount of the polyisocyanate can be from 1 part to 30 parts and preferably from 2 parts to 10 parts by weight per 100 parts of the polymer of vinyl chloride.

The adhesive compositions of the present invention can be stored for several days without substantial deterioration of the composition. It has hitherto been a disadvantage of adhesive compositions consisting of polyvinylchloride and an organic polyisocyanate that they had to be used fairly soon after the polyisocyanate had been incorporated, since if the composition was allowed to stand it became difficult to spread and the adhesive property was reduced. The practice, therefore, was to prepare the composition immediately prior to use, and this resulted in a non-continuous process. The compositions of the present invention, on the other hand, can be stored for three or more days without serious deterioration, and so are suitable for use in continuous processes.

The adhesive compositions are particularly suitable for bonding textile materials such as sheets, woven fabrics, and non-woven fabrics. Synthetic textile fibres as well as natural fibres can be bonded using the adhesive compositions, and examples of the use of the compositions are in the manufacture of mechanical belting where it is desired to bond a reinforcement of synthetic textile fibres to the covering material, and in the production of carpets by an electrostatic flocking technique. In the production of carpets, one surface of a base layer of woven or non-woven fabric or felt can be coated with the adhesive composition and the surface of the resulting adhesive layer can be flocked. The adhesive composition can then be cured to firmly lock the flock in position.

Curing of the adhesive composition can be effected by heating the composition at an elevated temperature, say about 100° C., followed by a further heating at from 150° C. to 200° C., preferably about 170° C. This heating causes fusion of the composition and results in a strong adhesive bond to natural and synthetic fibres.

The invention is illustrated by the following examples, in which all "parts" are parts by weight.

Example I

A polymer composition (Composition A) was prepared according to the following formulation.

| Composition A: | Parts |
|---|---|
| Polyvinylchloride [1] | 2,000 |
| Dinonyl phthalate | 1,840 |
| Epoxidised soya bean oil (Abrac A) | 40 |
| Liquid barium-cadmium-zinc stabilizer (Mark KCB) | 40 |
| Dispersion of stearic anhydride [2] | 80 |

[1] The polyvinylchloride was a plasticized resin having a K value of 65, available under the trade name Corvic P65/54.
[2] The dispersion of stearic anhydride was a dispersion of 60 parts of stearic anhydride in 40 parts of dinonyl phthalate.

The polyvinylchloride, epoxidised soya bean oil, stabilizer and 1200 parts of the dinonyl phthalate were initially mixed on a triple roll mill to give a viscous paste. The other ingredients were then stirred in and the mixture was milled again.

Five Compositions, A1 to A5, were prepared by mixing the Composition A with a crude form of 4,4′-diphenylmethane diisocyanate. In each case, the amount of Composition A used contained 100 parts of the polyvinylchloride, and the amounts of the diisocyanate were 0 part, 1 part, 2 parts, 5 parts and 10 parts respectively. To prepare each of the compositions A1 to A5 the diisocyanate was added to Composition A and was stirred into the composition in a ½ pint tin. The tin was then closed and the composition was agitated on mixing rolls for 15 minutes.

After mixing, a small amount of each composition was withdrawn and was stored in a sealed container for 3 days at room temperature, after which time the composition was examined for surface skin formation. The results are shown in Table I below.

The remainder of each composition was used to carry out adhesion tests to Nylon 66 at intervals over a period of 3 days, the composition being agitated throughout prior to use to prevent surface skin formation, and the results are shown in Table I below.

The adhesive test was performed as follows. Nylon 66 monofilaments were asembled under slight tension in a rectangular frame. The monofilaments were arranged in parallel relationship with a separation of ½ inch between adjacent monofilaments. A mould provided with slots to acommodate the monofilaments was placed in the frame transverse the monofilaments at 90° so that a half inch length of each monofilament was enclosed within the mould cavity. The monofilaments within the mould cavity were wiped with carbon tetrachloride to remove surface contamination due to handling and then a coating of the adhesive composition was produced on each monofilament by brushing. The frame was placed in an air-circulating oven at a temperature of 100° C. for 10 minutes, after which time it was transferred to a hot plate. The mould cavity was filled with Composition A (a composition which does not contain a diisocyanate). The heat of the mould was sufficient to set the composition at the edges and so prevent leakage of the composition through the slots in the mould. The mould was closed and then heated to 170° C. for 20 minutes to fuse the plastisol composition. The mould was then cooled and the fused composition with the monofilaments embedded in it was removed. The monofilaments were cut at one edge of the fused composition to provide the test-piece, which was in the form of a block of the fused composition having the monofilaments embedded therein and extending outwardly from one side thereof.

The test-piece was allowed to stand at room temperature for 1 day and then the monofilaments were subjected to a pull-through test using a jaw separation speed of 10 inches per minute.

The results of the tests are shown in Table I below. In this table and in subsequent tables, "time" represents the time in days for which the composition was agitated prior to use, and "skin formation" indicates the condition of the composition after storing for 3 days.

TABLE I

| Composition | Time (days) | Adhesion (kgm.) | Skin Formation |
|---|---|---|---|
| A1 | 0<br>1<br>2<br>3 | 0.9<br>1.0<br>0.4<br>0.2 | None. |
| A2 | 0<br>1<br>2<br>3 | 4.6<br>4.2<br>3.1<br>2.4 | Do. |
| A3 | 0<br>1<br>2<br>3 | 4.7<br>4.7<br>4.3<br>3.7 | Do. |
| A4 | 0<br>1<br>2<br>3 | 6.2<br>5.8<br>5.5<br>5.3 | Soft, dispersible skin. |
| A5 | 0<br>1<br>2<br>3 | 5.9<br>5.8<br>5.7<br>5.7 | Do. |

The above series of experiments was repeated using a different composition, Composition B, instead of Composition A. Composition B was prepared in the same way as Composition A except that the addition of 80 parts of a dispersion of 60 parts of stearic anhydride in 40 parts of dinonyl phthalate was excluded. The results are shown in Table IA.

TABLE IA

| Composition | Time (days) | Adhesion (kgm) | Skin Formation |
|---|---|---|---|
| B1 | 0<br>1<br>2<br>3 | 0.9<br>0.9<br>0.8<br>0.8 | None. |
| B2 | 0<br>1<br>2<br>3 | 3.7<br>1.3<br>1.1<br>1.1 | Do. |
| B3 | 0<br>1<br>2<br>3 | 5.0<br>1.4<br>1.2<br>1.0 | Do. |
| B4 | 0<br>1<br>2<br>3 | 5.9<br>3.1<br>1.8<br>1.1 | Slight dispersible skin. |
| B5 | 0<br>1<br>2<br>3 | 6.3<br>5.0<br>4.9<br>3.9 | Thick, solid skin. |

The results in Tables I and IA show that an adhesive composition comprising a plasticized polyvinylchloride and an organic diisocyanate deteriorates rapidly on standing, whereas a similar composition comprising stearic anhydride does not.

Example II

Four polymer compositions, C1 to C4, were prepared as described in Example I according to the following formulations:

| | Parts | | | |
|---|---|---|---|---|
| | C1 | C2 | C3 | C4 |
| Polyvinylchloride (Corvic P65/54) | 100 | 100 | 100 | 100 |
| Trixylyl phosphate | 92 | 92 | 92 | 92 |
| Epoxidised soya bean oil (Abrac A) | 4 | 4 | 4 | 4 |
| Stabilizer | 3 | 3 | 3 | 3 |
| Dispersion of stearic anhydride* | 0 | 0 | 4 | 4 |
| 4,4′-diphenylmethane diisocyanate | 0 | 10 | 0 | 10 |

*A dispersion of 60 parts of stearic anhydride in 40 parts of dinonyl phthalate.

Each composition was tested as described in Example I and the results are shown in Table II.

TABLE II

| Composition | Time (days) | Adhesion (kgm.) | Skin Formation |
|---|---|---|---|
| C1 | 0<br>1<br>2<br>3 | 1.1<br>1.0<br>1.2<br>1.1 | None. |
| C2 | 0<br>1<br>2<br>3 | 3.6<br>3.5<br>3.2<br>3.0 | Thick, solid skin. |
| C3 | 0<br>1<br>2<br>3 | 1.3<br>1.2<br>1.1<br>1.1 | None. |
| C4 | 0<br>1<br>2<br>3 | 4.2<br>4.2<br>3.6<br>3.6 | Soft, Thick skin. |

These results show that the adhesive composition C4 containing stearic anhydride had a satisfactory potlife whereas the adhesive composition C2 which did not contain stearic anhydride deteriorated relatively rapidly. The results also show the increased adhesion obtained by adding a diisocyanate to the plasticized polyvinylchloride.

Example III

Two polymer compositions, D1 and D2, were prepared as described in Example I according to the formulations below.

| | Parts | |
|---|---|---|
| | D1 | D2 |
| Polyvinylchloride (Corvic P65/54) | 100 | 100 |
| Dinonyl phthalate | 92 | 92 |
| Epoxidised soya bean oil (Abrac A) | 2 | 2 |
| Liquid barium-cadmium-zinc stabilizer (Mark KCB) | 2 | 2 |
| Lauric anhydride dispersion* | 0 | 4 |
| Diphynylmethane diisocyanate | 5 | 5 |

* The dispersion of lauric anhydride was a dispersion of 60 parts of lauric anhydride in 40 parts of dinonyl phthalate.

Each composition was tested as described in Example I and the results are given in Table III.

TABLE III

| Composition | Time (days) | Adhesion (kgm.) | Skin Formation |
|---|---|---|---|
| D1 | 0 | 5.7 | No skin, very viscous unspreadable. |
| | 3 | 2.2 | |
| D2 | 0 | 4.4 | No skin, low viscosity, spreadable. |
| | 3 | 3.1 | |

Example IV

Two polymer compositions E1 and E2 were prepared as described in Example I according to the formulations below.

| | Parts | |
|---|---|---|
| | E1 | E2 |
| Polyvinylchloride (Corvic P65/54) | 100 | 100 |
| Dinonyl phthalate | 92 | 92 |
| Epoxidised soya bean oil (Abrac A) | 2 | 2 |
| Liquid barium-cadmium-zinc stabilizer (Mark KCB) | 2 | 2 |
| Capric anhydride | 0 | 2.4 |
| Diphenylmethane diisocyanate | 5 | 5 |

Each composition was tested as described in Example I and the results are given in Table IV.

TABLE IV

| Composition | Time (days) | Adhesion (kgm.) | Skin Formation |
|---|---|---|---|
| E1 | 0 | 6.6 | Extremely viscous, not spreadable. |
| | 3 | 2.9 | |
| E2 | 0 | 6.0 | Low viscosity, spreadable. |
| | 3 | 3.1 | |

The results in Tables III and IV show the advantageous pot-life of compositions of the present invention, D2 and E2, over similar compositions not containing an aliphatic acid anhydride, D1 and E1.

Having now described my invention, what I claim is:

1. A heat-curable adhesive composition comprising a vinyl chloride polymer, an organic polyisocyanate, said polyisocyanate being present in an amount of from 1 to 30 parts by weight to 100 parts by weight of the vinyl chloride polymer, an anhydride of a saturated aliphatic acid containing from 9 to 17 carbon atoms, and a plasticizer for the vinyl chloride polymer, said plasticizer being present in an amount of from 10 to 150 parts by weight to 100 parts by weight of vinyl chloride polymer.

2. An adhesive composition according to claim 1 in which the amount of aliphatic acid anhydride is from 1 part to 5 parts by weight per 100 parts by weight of the polymer of vinyl chloride.

3. An adhesive composition according to claim 2 in which the amount of aliphatic acid anhydride is from 2 parts to 3 parts by weight per 100 parts by weight of the polymer of vinyl chloride.

4. An adhesive composition according to claim 1 in which the aliphatic acid is monobasic.

5. An adhesive composition according to claim 1 in which the aliphatic acid anhydride is capric anhydride.

6. An adhesive composition according to claim 1 in which the aliphatic acid anhydride is lauric anhydride.

7. An adhesive composition according to claim 1 in which the aliphatic acid anhydride is stearic anhydride.

8. An adhesive composition according to claim 1 in which the polymer of vinyl chloride has a K value of from 50 to 80.

9. An adhesive composition according to claim 8 in which the K value is from 55 to 75.

10. An adhesive composition according to claim 1 in which the amount of plasticizer is from 50 parts to 120 parts by weight per 100 parts by weight of the polymer of vinyl chloride.

11. An adhesive composition according to claim 1 in which the plasticizer is dinonyl phthalate.

12. An adhesive composition according to claim 1 in which the plasticizer is trixylyl phosphate.

13. An adhesive composition according to claim 1 in which the amount of organic polyisocyanate is from 2 parts to 10 parts by weight per 100 parts by weight of the polymer of vinyl chloride.

14. An adhesive composition according to claim 1 in which the organic polyisocyanate is a diisocyanate.

15. An adhesivte composition according to claim 14 in which the diisocyanate is diphenylmethane diisocyanate.

16. A method for the manufacture of an adhesive composition comprising mixing together the composition ingredients of claim 1.

17. A method according to claim 16 wherein the vinyl chloride polymer is mixed with said plasticizer and the thus-plasticized vinyl chloride polymer is mixed first with said aliphatic acid anhydride and thereafter with said organic polyisocyanate.

18. A method of curing an adhesive composition according to claim 1 comprising initially heating the composition at 100° C. and further heating the composition at from 150° C. to 200° C.

19. A method according to claim 18 in which the further heating is at a temperature of 170° C.

20. A cured adhesive composition when cured by the method of claim 18.

References Cited

UNITED STATES PATENTS

| | | | |
|---|---|---|---|
| 3,084,127 | 4/1963 | Vakousky | 260—859 |
| 2,893,969 | 7/1959 | Graham | 260—859 |
| 3,300,420 | 1/1967 | Frey | 260—77.5 |
| 3,317,480 | 5/1967 | Fetscher | 260—77.5 |
| 3,314,923 | 3/1967 | Muller | 260—77.5 |
| 3,236,675 | 2/1961 | Hermitte | 260—859 |

MORRIS LIEBMAN, *Primary Examiner.*

S. L. FOX, *Assistant Examiner.*

U.S. Cl. X.R.

260—77.5, 859